(12) United States Patent
Kaydi et al.

(10) Patent No.: US 11,718,333 B2
(45) Date of Patent: Aug. 8, 2023

(54) DEVICE FOR RECEIVING, TRANSPORTING AND STORING PIECES OF FURNITURE

(71) Applicant: SENKA SYSTEMS GmbH, Büttelborn (DE)

(72) Inventors: Ömer Kaydi, Büttelborn (DE); Mehmet Sen, Darmstadt (DE)

(73) Assignee: SENKA SYSTEMS GmbH, Büttelborn (DE)

( * ) Notice: Subject to any disclaimer, the term of this patent is extended or adjusted under 35 U.S.C. 154(b) by 270 days.

(21) Appl. No.: 17/271,344

(22) PCT Filed: Aug. 22, 2019

(86) PCT No.: PCT/EP2019/072499
§ 371 (c)(1),
(2) Date: Feb. 25, 2021

(87) PCT Pub. No.: WO2020/043595
PCT Pub. Date: Mar. 5, 2020

(65) Prior Publication Data
US 2022/0204064 A1    Jun. 30, 2022

(30) Foreign Application Priority Data

Aug. 27, 2018 (DE) .................. 10 2018 120 855.3
Dec. 12, 2018 (DE) .................. 20 2018 107 120.3

(51) Int. Cl.
*B62B 3/10* (2006.01)
*B62B 3/00* (2006.01)
*B65G 1/10* (2006.01)

(52) U.S. Cl.
CPC .............. *B62B 3/005* (2013.01); *B62B 3/10* (2013.01); *B65G 1/10* (2013.01); *B62B 2202/30* (2013.01)

(58) Field of Classification Search
CPC ........ B62B 3/005; B65G 1/10; B62D 33/0207
See application file for complete search history.

(56) References Cited

U.S. PATENT DOCUMENTS 2,706,057 A    4/1955 Belding
3,902,613 A *  9/1975 Newland ................. B60P 3/062
                                                                  410/3

(Continued)

FOREIGN PATENT DOCUMENTS

CN       206231420 U      6/2017
DE    202010008432 U1    12/2010

(Continued)

OTHER PUBLICATIONS

International Search Report (dated Mar. 23, 2020) for corresponding International App. PCT/EP2019/072499.

(Continued)

*Primary Examiner* — Jonathan Snelting
(74) *Attorney, Agent, or Firm* — WRB-IP PLLC

(57) ABSTRACT

A device for receiving, transporting and storing pieces of furniture includes a movable support rack and a lifting apparatus fastened to the movable support rack, wherein it is possible to lift a first piece of furniture using the lifting apparatus such that a second piece of furniture can be arranged below the first piece of furniture that has been lifted by the lifting apparatus. The movable support rack includes a locking apparatus for locking the second piece of furniture on or in the movable support rack. The support rack includes a base frame that is open at a front side such that the device can receive the pieces of furniture at the front side of the base frame.

17 Claims, 3 Drawing Sheets

(56) References Cited

U.S. PATENT DOCUMENTS

| | | | | |
|---|---|---|---|---|
| 4,749,317 A | * | 6/1988 | Daniel | B60P 3/08 |
| | | | | D12/1 |
| 4,954,038 A | | 9/1990 | Sheahan | |
| 5,988,597 A | | 11/1999 | Egan | |
| 7,861,828 B1 | * | 1/2011 | Shepard | B66F 7/0641 |
| | | | | 187/218 |
| 8,328,029 B1 | | 12/2012 | Binsfeld et al. | |
| 9,550,445 B2 | * | 1/2017 | Holmgren | B60P 1/04 |
| 2016/0031465 A1 | | 2/2016 | Turbett et al. | |

FOREIGN PATENT DOCUMENTS

| | | |
|---|---|---|
| DE | 202016102863 U1 | 8/2016 |
| DE | 202016103991 U1 | 8/2016 |
| EP | 0366827 A1 | 5/1990 |
| RU | 202639 U1 | 3/2021 |

OTHER PUBLICATIONS

Russian Official Action (dated Jan. 20, 2023) for corresponding Russian App. 2021108102.
Chinese Official Action (dated Nov. 28, 2022) for corresponding Chinese App. 201980071194.5.

* cited by examiner

DEVICE FOR RECEIVING, TRANSPORTING AND STORING PIECES OF FURNITURE

BACKGROUND AND SUMMARY

The invention relates to a device for receiving, transporting and storing pieces of furniture, comprising a movable support rack and comprising a lifting apparatus fastened to the movable support rack, wherein it is possible to lift a first piece of furniture using the lifting apparatus such that a second piece of furniture can be arranged below the first piece of furniture that has been lifted by the lifting apparatus.

It is known from practice that pieces of furniture, such as chairs or tables which are not permanently required in a location, are transported on and optionally stored in transport apparatuses until the pieces of furniture are required again and are put in place at the intended location. One example of this are stackable chairs in an events hall, which, as required, are set out in the events hall for the event in question and are then put away again and stored in a storeroom so that the events hall can be used for other purposes. The chairs and tables can be rapidly and easily transported using a sack barrow, for example.

Movable trolleys are also known on which stacked chairs or tables can be stored and stowed away. Arranging and storing a plurality of pieces of furniture in a space-saving manner on a sack barrow or a trolley of this kind requires the pieces of furniture in question to be stackable, however. Very heavy or non-stackable pieces of furniture cannot be stored and stowed away in a space-saving manner using the trolleys known from practice.

From practice, movable workshop cranes are also known using which very heavy objects, such as car engines or also very heavy pieces of furniture, as the case may be, could be lifted. Workshop cranes of this kind are, however, unsuitable for arranging and transporting more than one very heavy piece of furniture one on top of the other.

It is desirable to design a device such that this device can be used to rapidly and easily arrange and transport at least two possibly heavy pieces of furniture one on top of the other.

According to an aspect of the invention a movable support rack comprises a locking apparatus for locking the second piece of furniture on or in the movable support rack.

The movable support rack expediently has the largest possible usable interior space, in which a piece of furniture can be arranged such that the movable support rack surrounds the piece of furniture. By configuring the device in this way, a first piece of furniture can be rapidly and easily arranged within the support rack and lifted by means of the lifting apparatus, such that a second piece of furniture can be arranged below the first piece of furniture. To arrange these two pieces of furniture in this way, only one area of floor space is therefore required, which corresponds to one of the two pieces of furniture or to the larger of the two pieces of furniture. If the second piece of furniture comprises furniture transport rollers, the second piece of furniture can be moved and stored by being locked in or on the support rack together with the lifted first piece of furniture by means of the device according to the invention, which increases the efficiency when transporting the pieces of furniture.

The device makes it possible to store a plurality of pieces of furniture one above the other and, as a consequence, to store a plurality of pieces of furniture within a comparatively small floor space without complex structural measures being required in a storage space. The movable support rack is expediently intended and accordingly configured for receiving high loads or for receiving heavy pieces of furniture. The lifting apparatus may be designed and configured such that even heavy or bulky pieces of furniture can be picked up and lifted using the lifting apparatus by a single user.

The device according to the invention may have a structurally simple design of the movable support rack, the lifting apparatus and the locking apparatus. The support rack may be made of welded-together, joined or interconnected profiled steel pans, for example. The device may comprise laterally arranged handles so that the device can be moved easily.

In an advantageous implementation of the concept of the invention, it is provided that the support rack comprises a base frame that is open at a front side such that the device can receive the pieces of furniture at the front side of the base frame. In the base region, the support rack only comprises rack elements on a rear side opposite the front side and on adjacent sides, while an interior space surrounded by the support rack is freely accessible from the front side, such that the piece of furniture can be easily slid into the support rack or, where necessary, the support rack can be easily slid over the piece of furniture. Other rack or frame elements may be formed on or fastened to the base frame, in order to increase the maximum mechanical load that can be received by the support rack or to improve protection against damage to a piece of furniture arranged within the support rack, for example.

According to an advantageous configuration of the concept of the invention, it is provided that the locking apparatus can be moved from a receiving position, in which the pieces of furniture can be received on the front side, into a locking position, in which a receiving opening made on the front side of the movable support rack is restricted. Restricting the receiving opening prevents a piece of furniture located in the interior space of the support rack from being able to be moved out through the receiving opening again, such that when the movable support rack is moved, the piece of furniture arranged therein is moved with it. Preferably, the locking apparatus is designed as a blocking bar articulated to the front side of the support rack. The locking apparatus may also be designed as a blocking chain. It is also possibly and optionally provided that the base frame forms inwardly projecting clamping elements in the locking position.

In order to configure the support rack to be movable, it is preferably provided that the support rack comprises transport rollers arranged on the base frame, preferably pivotable transport rollers. It is also possibly and optionally provided, according to the invention, that at least two of the transport rollers can be electrically driven.

In a piece of furniture with pivotable furniture transport rollers, in order to prevent a potential collision between the transport rollers and the furniture transport rollers, according to a configuration of the concept of the invention, it is advantageously provided that the device comprises receiving rails, into which the piece of furniture can be slid. The receiving rails may for example be directly fastened to the sides of the base frame by means of a base surface of the movable support rack. Advantageously, the receiving rails are arranged only slightly above the base surface and are optionally provided with sloping loading ramps in order to make it easier to slide the piece of furniture in. It may also be provided that the receiving rails are mounted on the base frame so as to be height-adjustable or inclinable.

In order to increase the mechanical stability of the support rack, it is preferably provided that the support rack comprises a peripheral top frame. Other elements which are required for lifting a piece of furniture or can be used to protect the pieces of furniture received in the support rack against environmental influences or damage may advantageously be attached to the top frame.

According an advantageous configuration of the device according to the invention, it is provided that the lifting apparatus comprises a group of at least two engagement elements arranged on opposite sides of the support rack, wherein it is possible to bring the group of engagement elements into engagement with the first piece of furniture, and wherein each engagement element in the group of engagement elements is operatively connected to a drive apparatus by mechanical actuation means, such that the first piece of furniture can be lifted by the lifting apparatus by operating the drive apparatus.

When the concept of the invention is configured in this way, the first piece of furniture arranged in the support rack can be rapidly and easily gripped and lifted by the lifting apparatus. The at least two engagement elements may be hooks or angular support elements, for example. The mechanical actuation means may be toothed racks or threaded rods, for example. When the lifting apparatus comprises a cable-hoist mechanism, the actuation means may be cables, chains or belts. The drive apparatus may be an electric motor, for example. It is also possibly and optionally provided, according to the invention, that the actuation means and the drive apparatus constitute a unit and are designed as linear drives, such as electrical linear drives, as pneumatic cylinders or as hydraulic cylinders.

When used as intended, the at least two engagement elements may be arranged at approximately the same height. The at least two engagement elements may also be adjustable in height independently of one another, in order to make it possible to receive pieces of furniture having irregular shapes. By using the cable-based operating means, such a configuration of the lifting apparatus may for example be made possible by means of a friction buckle, a cable clamp or a cable pulley. In particular when using separate linear drives for each engagement element, a separate height adjustment of the respective engagement elements relative to one another can be carried out rapidly and easily.

Preferably, one drive apparatus of the device, or, optionally, the plurality of drive apparatuses of the device, can be operated independently. It is also possibly and optionally provided, according to the invention, that the drive apparatus is supplied with power by a power source provided at a point of use, for example by means of an electrical mains lead or a compressed-air line.

Advantageously, the device comprises a monitoring unit which can preferably be operated from the front side of the device and by means of which the lifting apparatus can be operated. The electrically operable transport rollers may also potentially be operated using the monitoring unit.

In order to easily and cost-effectively produce the lifting apparatus and to operate said lifting apparatus without maintenance as far as possible, it is provided that the actuation means of the lifting apparatus are cable elements, preferably cable-hoist apparatuses. When using cable hoists comprising pulleys, the drive apparatus may be arranged in the region of the base frame, meaning that the centre of gravity of the device is lowered and the potential risk of the device tipping over is reduced.

In an advantageous implementation of the concept of the invention, it is provided that the lifting apparatus comprises at least two guide rails that are arranged on the sides of the support rack and are each assigned to an engagement element, wherein each engagement element is forcibly guided by the assigned guide rail, wherein the at least two engagement elements are operatively connected to the drive apparatus. The engagement elements guided in the guide rails may be actuated using the cable elements or cable-hoist apparatuses. It is also possibly and optionally provided, according to the invention, that the engagement elements guided in the guide rails are directly driven by electrical linear drives, pneumatic cylinders or hydraulic cylinders.

In order to make it easier to receive the pieces of furniture, it is provided that the at least two engagement elements are pivotally mounted on the associated guide rail. Preferably, engagement elements of this kind are designed as angular support elements that project from the guide rail. The engagement elements may be configured to be spring-loaded, such that they are pivoted upwards when a load is not supported on the relevant engagement element. Preferably, the pivotable engagement elements comprise an abutment, such that said elements cannot be pivoted downwards to any extent desired and can be fixed in a horizontal orientation, for example, in order to be able to hold and lift a piece of furniture.

In order to configure the device for use with a plurality of pieces of furniture, it is advantageously provided that the device comprises at least two separately operable groups of at least two engagement elements, such that the device can lift at least two pieces of furniture. When the device is configured in this way, the at least two groups of engagement elements can advantageously be operated independently of one another using just one drive apparatus. In an alternative configuration of the concept of the invention, the at least two groups of engagement elements can be operated using the associated drive apparatus. In particular, when linear drives are used, each individual engagement element can be operated by an associated drive apparatus. In such a configuration of the concept of the invention, the at least two engagement elements associated with the group can be operated together.

In order to configure the device to be operable independently, it is advantageously provided that the device comprises an energy storage device for operating, the drive apparatus. In this way, the drive apparatus may for example comprise a rechargeable battery or a compressed-air tank.

In order to protect the pieces of furniture that can be transported and optionally stored in the device against environmental influences, is preferably provided that the device comprises outer cladding that surrounds the device or the movable support rack in regions. It is also possibly and optionally provided, according to the invention, that the receiving opening made on the front side of the device is designed to be closed by double doors articulated to the sides of the support rack, or by a roller shutter.

It is preferably provided that the device is adapted for use for hospital beds. The device may be constructed such that the support rack is designed, in terms of its dimensions and the maximum permissible load, for receiving hospital beds and the lifting apparatus is designed for lifting hospital beds. Advantageously, the device can be rapidly and easily cleaned, in order to also satisfy strict hygiene regulations in hospitals. It is also possibly and optionally provided, according to the invention, that the device does not comprise any highly combustible components or is equipped with additional fire retardants in order to fulfil fire regulations in hospitals.

In order to make it possible to transport the device comprising two hospital beds received therein on hospital premises so as to be unimpeded as far as possible and to store said device in storage rooms, which are often in the basement, according to an advantageous configuration of the concept of the invention, it is provided that the device does not exceed a maximum height of 1.9 metres, a maximum width of 1.1 metres and a maximum length of 2.3 metres.

In order to make it possible to disinfect or decontaminate pieces of furniture that are contaminated with pathogenic germs or are infected with pests within the device, according to an advantageous configuration of the concept of the invention, it is provided that the device comprises a cover that sealingly surrounds the usable space in the device intended for the pieces of furniture that can be received therein, such that a disinfectant introduced into the device remains within the cover. The disinfectant may be a gas, a mist or a smoke, wherein a mixture of a gas and a liquid are referred to as a mist, and a mixture of a solid phase and a gaseous phase being referred to as a smoke. The disinfectant may for example be a mist made up of air/hydrogen peroxide, air/peracetic acid, or a mixture thereof. Advantageously, the liquid used for generating the mist comprises silver ions. The disinfectant may also be a gas such as ozone, formaldehyde or sulfuryl fluoride. It is also possibly and optionally provided, according to the invention, that the disinfectant is a smoke made up of air/pyrethrum. The smoke may also be a flue gas that develops from burning organic material such as wood.

In order to make it possible to comply with the strict hygiene regulations in hospitals, it is advantageous to disinfect the hospital bed using a suitable disinfectant in addition to sanitising and wiping surfaces of the hospital bed. In the field of furniture restoration, for pieces of furniture that are made of wood and infected with wood pests, for example, the wood pests remaining in the wood of the piece of furniture can be combatted by the disinfectant.

In larger hospitals or in restoration companies, disinfection mostly takes place in a central disinfection facility, such that the disinfection of individual hospital beds or pieces of furniture is associated with high logistical complexity. The hospital beds have to be brought to the central disinfection facility from the relevant ward in which the hospital beds are used, and have to be stored and disinfected in said facility for a relatively long period of time. The disinfection facility has to be kept available and has icy be maintained. Transporting the hospital beds is associated with considerable staffing resources, especially since, when beds are change frequently, a hospital bed has to be disinfected again after a short period of time.

By contrast, the device designed to have the cover allows the hospital bed to be disinfected in a decentralised manner, close to the location in which the hospital bed is actually used, i.e. in an unused room or in a corridor region on the ward in question, for example.

The cover seals the usable volume covered by the cover from the surroundings, to which volume the disinfectant can be applied during the disinfection. As a result, environmentally damaging disinfectants may potentially also be used without separate protective measures being required for the surroundings. Furthermore, for a usable volume adapted to the size of the pieces of furniture or hospital beds to be received, the quantity of disinfectant required for the disinfection can be reduced, in particular in comparison with the otherwise standard rooms that are usually used as a central disinfection facility in hospitals.

Sealing of the cover may be adapted to the disinfectant that is provided in each case. For example, sealing, of the cover that is sufficient in practice for a mist-like, non-environmentally hazardous disinfectant can be ensured by a cover having a simpler design, compared with the sealing for a gaseous, potentially toxic disinfectant.

The cover may be made of a flexible material, for example a plastics film, wherein the cover surrounds the support rack on all sides and being fixed to the floor in an adhesive and sufficiently sealing manner for the duration of a disinfection process. It is also possibly and optionally provided, according to the invention, that the cover comprises dimensionally stable cover side-wall elements and a dimensionally stable cover roof element, which are interconnected ire a disinfectant-tight manner and surround the support rack and the pieces of furniture arranged therein. In order to bring about sealing against the floor, movable sealing elements resting on the floor may be provided by the cover side-wall elements for the decontamination, wherein the respective sealing elements are also formed and arranged in sealing manner on contact surfaces with adjacently arranged sealing elements of adjoining cover side-wall elements.

It is also conceivable that, in an alternatively possible configuration of the cover, the cover side-wall elements together with the cover roof element form a dimensionally stable cover housing which is open towards the floor and can be moved towards the floor for the duration of the disinfection in order to be positioned on the floor in a sealing manner and to surround the usable space in the cover in a sealing manner together with the floor.

With regard to a cover of the usable space that is as sealed and reliable as possible, it is likewise possible and conceivable for the cover to further comprise a cover floor element, which delimits and seals the cover housing towards the floor. The cover floor element may be arranged at a short distance above the floor and is merely intended to make it possible to move the device. The piece of furniture or hospital bed to be disinfected then only has to be rolled or pushed onto the cover floor element arranged directly above the floor, wherein it is possible for extendable ramps or rails to optionally be used as an aid.

In order to introduce the disinfectant into the cover, it is advantageously provided that the device comprises a disinfectant supply apparatus, wherein the disinfectant supply apparatus is able to introduce the disinfectant into the cover of the device such that the pieces of furniture arranged in the device can be disinfected by the disinfectant. The disinfectant supply apparatus may for example be a misting system, a gas-introduction system or a flue-gas-generating system. The disinfectant supply apparatus may be arranged within the cover or outside the cover and may preferably be fastened to the support rack.

According to an advantageous implementation of the concept of the invention, it is provided that the device comprises a connection apparatus, wherein it is possible to introduce the disinfectant into the device from outside the cover through the connection apparatus. In such a configuration of the device, the disinfectant provided by the disinfectant supply apparatus arranged outside the cover is introduced into the cover through the connection apparatus. It is also possibly and optionally provided, according to the invention, that a disinfectant supply apparatus that is separate from the device is connected to the device by means of the connection apparatus.

As a result, in an advantageous manner, a transportable disinfectant supply apparatus can be connected to the connection apparatus as required and can be used to disinfect pieces of furniture arranged in the cover, for example.

The connection apparatus may also comprise a connection element accessible from outside the cover, to which element a disinfectant tube of the disinfectant supply apparatus can be connected so as to be gas-tight, in a force-locked and optionally form-fitting manner.

In another advantageous implementation of the concept of the invention, it is provided that the device comprises a monitoring apparatus, wherein it is possible to record furniture information regarding the pieces of furniture arranged in the device by means of the monitoring apparatus. The furniture information may for example include a furniture identification number assigned to the relevant piece of furniture or a period of time since the last disinfection. From the period of time since the last disinfection, the point in time at which the next disinfection of the piece of furniture is due is fully automatically indicated to the user at predetermined disinfection intervals.

The furniture information, such as the furniture identification number, may for example be manually input by the user using an input element, such as a touch-sensitive dot-matrix display element. It is also possibly and optionally provided, according to the invention, that the furniture information can be electro-optically detected by the user. For example, a barcode attached to the piece of furniture can be detected by a barcode reader. Alternatively, the furniture information may also be detected in an automated, contactless manner by reading out a transponder of the relevant piece of furniture. The furniture information may be displayed to the user on a display apparatus, such as the touch-sensitive dot-matrix display element.

In an advantageous manner, the monitoring apparatus comprises a communication apparatus, which allows for preferably wireless communication with external communication devices in order to make it possible to exchange information detected by the monitoring apparatus, including the furniture information, with the external communication devices. The monitoring apparatus may optionally be connected to a central logistics facility in a data-transmitting manner by means of the communication element, such that the monitoring apparatus can transfer the furniture information as well as other relevant information to the logistics facility when required or at predetermined intervals. In this way, the furniture identification number or the period of time since the last decontamination for the pieces of furniture received in the device can be accessed at the central logistics facility, for example. If the device is intended for use at frequently changing locations, the device may also comprise a GPS module or another position sensor or position-information transmitter and may transmit the current location of the device.

The data-transmitting communication with external communication devices or with the central logistics facility may for example be established over a wireless local area network, by data transmission over short distances between devices by wireless technology, or over a mobile-communications connection.

BRIEF DESCRIPTION OF THE DRAWINGS

In the following, some embodiments of the concept of the invention which are shown in the drawings are explained in greater detail. In the drawings.

DETAILED DESCRIPTION

Figure 1:
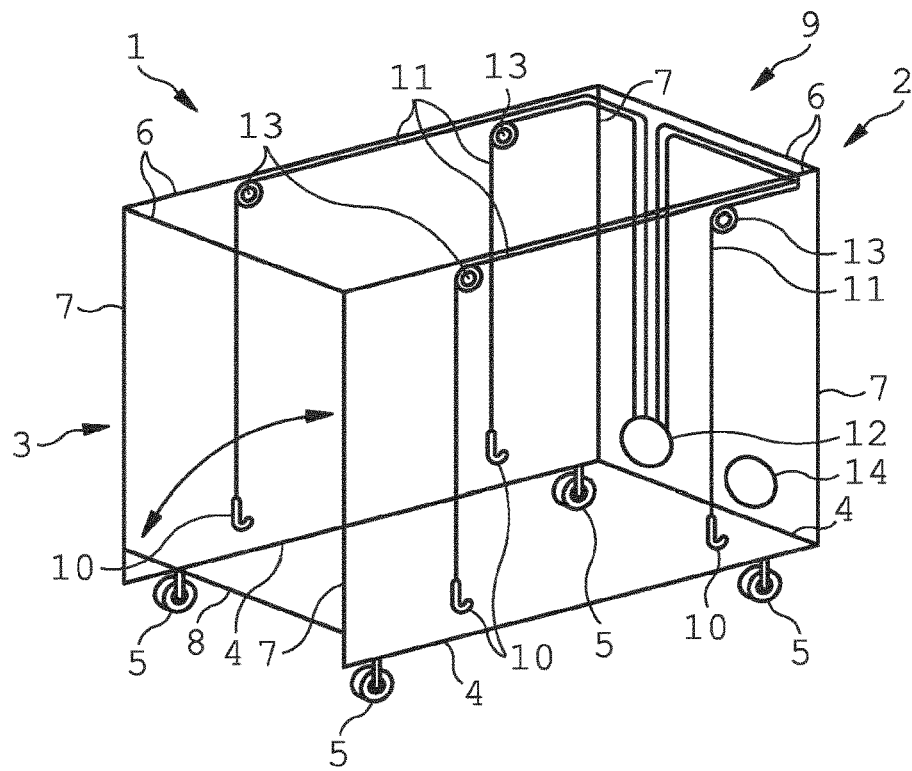
FIG. 1 to 3 are each a schematic view of different embodiments of a device according to the invention.

FIG. 1 shows a first embodiment of a device 1 according to the invention. The device 1 comprises a movable support rack 2. The support rack 2 comprises a base frame 4 that is open at a front side 3 of the device 1 and is arranged close to a base surface of the support rack 2 on the floor. Transport rollers 5 are attached to the base frame 4, by means of which rollers the support rack 2 can be moved over the floor.

The support rack 2 further comprises a top frame 6 arranged at a distance from the base surface on the floor. The base frame 4 and the top frame 6 are interconnected by vertical struts 7. A locking device 8, which is constructed as a pivotable bar in the embodiment shown here, is arranged on one of the struts 7 arranged on the front side 3 along an edge. The bar can be pivoted upwards and positioned against the strut 7 in order to open up the front side 3 and make it possible to introduce a piece of furniture into the interior space surrounded by the support rack 2. The bar can also be pivoted into a horizontal position and can be attached to an opposite strut 7 by its free end in order to retain, in the support rack, a piece of furniture located in the interior space in said support rack 2.

A lifting apparatus 9 is attached to the support rack 2. The lifting apparatus 9 comprises four engagement elements 10, which are designed as hooks here. The lifting apparatus 9 further comprises actuating elements 11, by means of which the engagement elements 10 are operatively connected to a drive apparatus 12. In the embodiment shown by way of example, the actuating elements 11 are cable-hoist apparatuses comprising cable elements and pulleys 13. The drive unit 12 is an electric motor. In order for it to be possible to use the embodiment of the device 1 shown here on a mains network independently of a permanent connection, the device 1 comprises an energy storage device 14, which is designed as a rechargeable battery.

Figure 2:
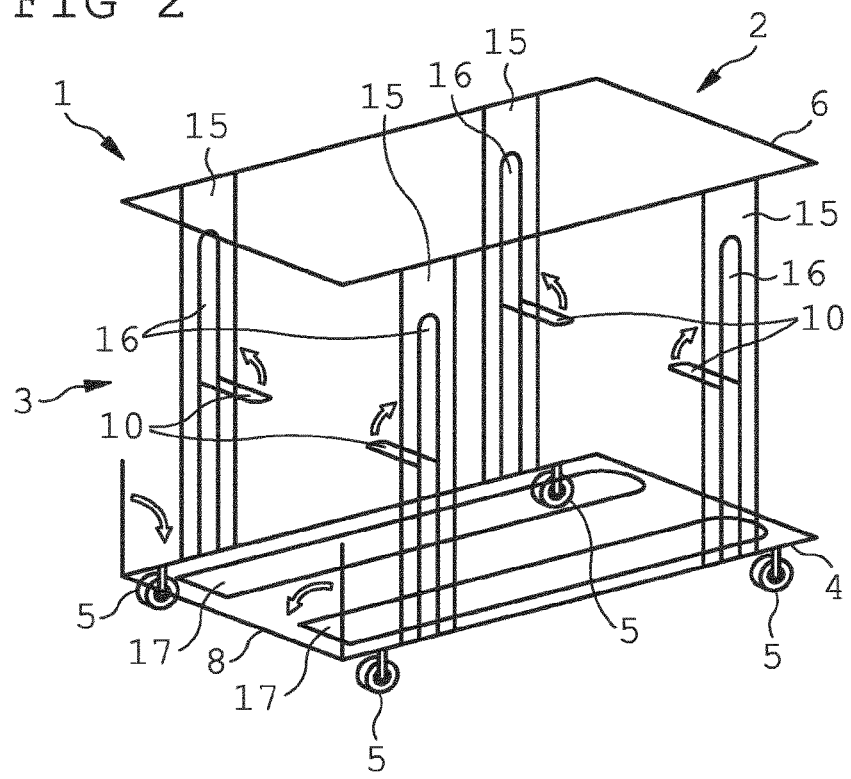

FIG. 2 shows a second embodiment of the device 1. In this embodiment of the device 1, the top frame 6 and the base frame 4 are interconnected by four lateral surface elements 15. The lateral surface elements 15 each comprise a guide rail 16. An engagement element 10 is forcibly guided in each of the guide rails 16. The engagement elements 10 are support elements that are pivotally mounted on the assigned guide rail 16. In this embodiment, the locking apparatus 8 comprises two pivotable bars.

The device 1 shown in FIG. 2 also comprises receiving rails 17 that are arranged immediately above the floor. A piece of furniture, for example a hospital bed which can itself be moved on wheels, can be slid into the receiving rails 17 and thus can be mounted in the device 1 at a distance from the floor and can be moved together with the support rack 2.

Figure 3:
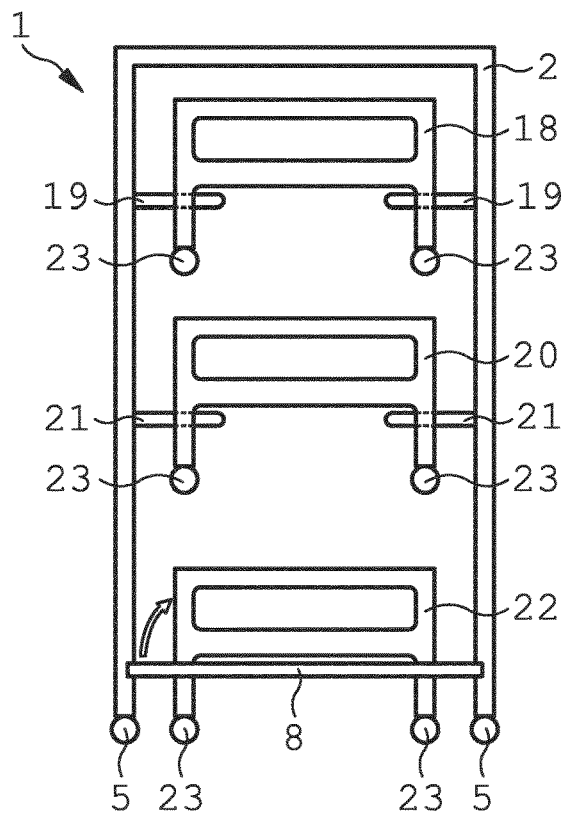

By way of example, FIG. 3 is a front view of a third embodiment of the device 1. A first piece of furniture 18 is arranged in the device 1 so as to be lifted by a first group 19 of engagement elements 10 and a second piece of furniture 20 is arranged in said device so as to be lifted by a second group 21 of engagement elements 10, so as to be one above the other within the support rack 2. A third piece of furniture 22 is arranged below the second piece of furniture 20. The three pieces of furniture 18, 20, 22 are hospital beds in this case. The pieces of furniture 18, 20, 22 comprise furniture transport rollers 23. The third piece of furniture 22 is locked in the transport rack 2 by a locking apparatus 8, such that the two pieces of furniture 18, 20 received in the device 1 and the third piece of furniture 22 can be transported in the device 1 at the same time.

Figure 4:
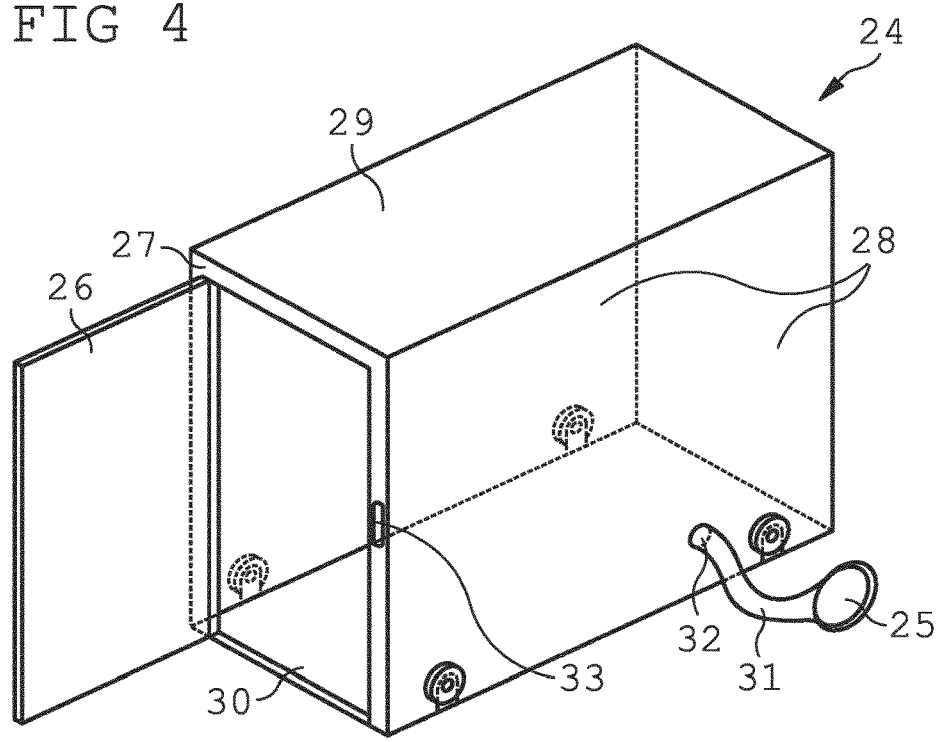
FIG. 4 is a schematic view of a cover of the device having a disinfectant supply apparatus connected to the cover.

FIG. 4 is a schematic view of a cover 24 that seals the usable volume of the device 1 and has a disinfectant supply apparatus 25 connected to the cover 24. For the sake of clarity, the support rack 2 surrounded by the cover 24 and comprising the lifting apparatus 9 attached to the support rack 2 is not shown in FIG. 4, wherein the cover 24 surrounds the support rack 2 and the pieces of furniture 18, 20, 22 received therein. The cover 24 comprises a cover door element 26, which is open for receiving the pieces of furniture 18, 20, 22. Furthermore, the cover 24 comprises a cover door element frame 27, three cover side-wall elements 28, a cover roof element 29, and a cover floor element 30. Once the pieces of furniture 18, 20, 22 are received and the cover door element 26 is closed, the cover 24 seals the device 1 from the surroundings. The cover 24 may be designed to be able to be lowered to the floor by means of the cover floor element 30 for receiving the pieces of furniture 18, 30, 22.

The disinfectant supply apparatus 25 is connected to the connection apparatus 32 of the device 1 by means of a disinfectant tube 31, wherein the connection apparatus 32 forms a closable opening in the cover 24, through which the disinfectant supplied by the disinfectant supply apparatus 25 can be introduced into the usable space surrounded by the cover 24. In the embodiment of the device 1 shown here, the disinfectant supply apparatus 35 is constructed separately from the device 1 in the form of a transportable misting system. For decontaminating the pieces of furniture 18, 20, 22, a disinfectant can be introduced into the cover 24 of the device 1 by means of the disinfectant supply apparatus 25. A user can input a furniture identification number for the relevant piece of furniture 18, 20, 22 to be received in the device 1 on a touch-sensitive dot-matrix display element of a monitoring apparatus 33.

Figure 5:
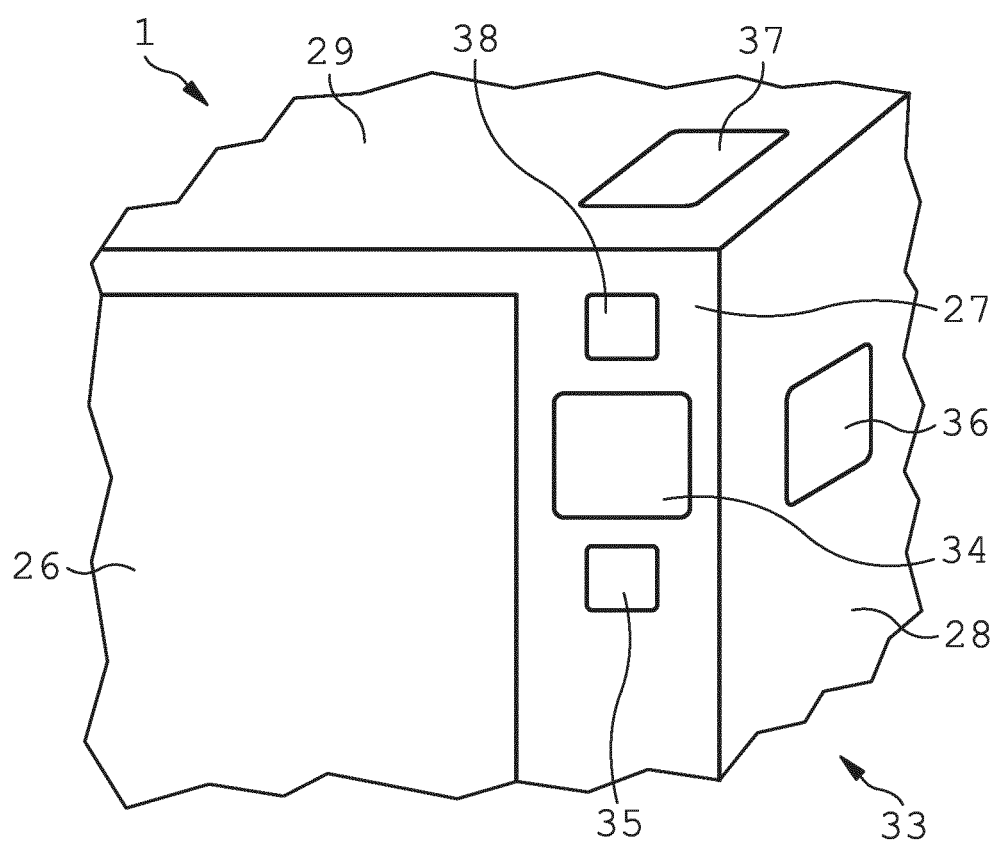
FIG. 5 is a schematic view of a detail of the device shown in FIG. 4.

FIG. 5 is a schematic view of a detail of the embodiment of the device 1 shown in FIG. 4. The monitoring apparatus 33 comprises a display element 34 and a control apparatus 35. In the embodiment of the device 1 shown here, the display element 34 is constructed as a dot-matrix display and the control apparatus 35 is designed as a keypad. The monitoring apparatus 33 comprises a reader 36 for contactlessly reading out the furniture identification number stored on a transponder of the pieces of furniture 18, 20, 22. The furniture identification number and a position of the pieces of furniture 18, 20, 22 received in the device 1 can be displayed on the display element 34, for example. Furthermore, a duration and a retraining time for a disinfection process taking place within the device 1 can be displayed on the display element 34. The monitoring apparatus 33 also comprises a positioning module 37. For example, the positioning module may be a receiving apparatus for satellite-based positioning, such as a global positioning system (GPS). The positioning module may also be a receiving apparatus for a local area network, wherein it is possible for the position of the device to be determined by determining a distance and optionally an angle relative to a large number of stationary base stations of the local area network with a known location of the respective base station.

Furthermore, the monitoring apparatus 33 comprises a communication apparatus 38, by means of which the monitoring apparatus 33 can wirelessly communicate with external communication devices or a central logistics facility. The communication apparatus 38 may for example be realized with the external communication devices or with the central logistics facility in a data-transmitting manner over a mobile-communications connection. For example, a position of the device 1 or the furniture identification number of the pieces of furniture 18, 20, 22 received by the device 1 can be transmitted to the external communication devices or the central logistics facility by the device 1. In this way, the device 1 can be used to make it easier to centrally manage the hospital beds.

LIST OF REFERENCE CHARACTERS

1 Device
2 Support rack
3 Front side
4 Base frame
5 Transport rollers
6 Top frame
7 Struts
8 Locking apparatus
9 Lifting apparatus
10 Engagement elements
11 Actuation elements
12 Drive apparatus
13 Pulleys
14 Energy storage device
15 Surface element
16 Guide rails
17 Receiving rails
18 First piece of furniture
19 First group of engagement elements
20 Second piece of furniture
21 Second group of engagement elements
22 Third piece of furniture
23 Furniture transport rollers
24 Cover
25 Disinfectant supply apparatus
26 Cover door element
27 Cover door element frame
28 Cover side-wall elements
29 Cover roof element
30 Cover floor element
31 Disinfectant tube
32 Connection apparatus
33 Monitoring apparatus
34 Display element
35 Control apparatus
36 Reader
37 Positioning module
38 Communication apparatus

The invention claimed is:

1. Device for receiving, transporting and storing pieces of furniture, comprising a movable support rack and comprising a lifting apparatus fastened to the movable support rack, wherein it is possible to lift a first piece of furniture using the lifting apparatus such that a second piece of furniture can be arranged below the first piece of furniture that has been lifted by the lifting apparatus, wherein the movable support rack comprises a locking apparatus for locking the second piece of furniture on or in the movable support rack, wherein the device comprises a cover that seals a space in the device intended for the pieces of furniture that can be received therein, such that a disinfectant introduced into the device remains within the cover, and wherein the device comprises a disinfectant supply apparatus, wherein the disinfectant supply apparatus is able to introduce the disinfectant into the cover of the device such that the pieces of furniture arranged in the device can be disinfected by the disinfectant.

2. Device according to claim 1, wherein the support rack comprises a base frame that is open at a front side such that the device can receive the pieces of furniture at the front side of the base frame.

3. Device according to claim 1, wherein the locking apparatus can be moved from a receiving position, in which the pieces of furniture can be received on the front side of the device, into a locking position, in which a receiving opening made on the front side of the movable support rack is restricted.

4. Device according to claim 1, wherein the support rack comprises transport rollers arranged on the base frame.

5. Device according to claim 1, wherein the support rack comprises receiving rails, into which the piece of furniture can be slid.

6. Device according to claim 1, wherein the support rack comprises a peripheral top frame.

7. Device according to claim 1, wherein the lifting apparatus comprises a group of at least two engagement elements arranged on opposite sides of the support rack, wherein it is possible to bring the group of engagement elements into engagement with the first piece of furniture, and wherein each engagement element in the group of engagement elements is operatively connected to a drive apparatus by mechanical actuation means, such that the first piece of furniture can be lifted by the lifting apparatus by operating the drive apparatus.

8. Device according to claim 7, wherein the lifting apparatus comprises at least two guide rails that are arranged on the sides of the support rack and are each assigned to an engagement element, wherein each engagement element is forcibly guided by the assigned guide rail, wherein the at least two engagement elements are operatively connected to the drive apparatus.

9. Device according to claim 8, wherein the at least two engagement elements are pivotally mounted on the associated guide rail.

10. Device according to claim 1, wherein the mechanical actuation means of the lifting apparatus are cable elements.

11. Device according to claim 1, wherein the device comprises at least two separately operable groups of at least two engagement elements each, such that the device can lift at least two pieces of furniture.

12. Device according to claim 1, wherein the device comprises an energy storage device for operating the drive apparatus.

13. Device according to claim 1, wherein the device comprises outer cladding that surrounds the device in regions.

14. Device according to claim 1, wherein the device is adapted for use for hospital beds.

15. Device according to claim 1, wherein the device does not exceed a maximum height of 1.9 metres, a maximum width of 1.1 metres and a maximum length of 2.3 metres.

16. Device according to claim 1, wherein the device comprises a connection apparatus, for introducing the disinfectant into the device from outside the cover.

17. Device according to claim 1, wherein the device comprises a monitoring apparatus, wherein it is possible to record furniture information regarding the pieces of furniture arranged in the device by means of the monitoring apparatus.

* * * * *